Oct. 8, 1940.   C. R. DOTY   2,217,161
SIGNALING SYSTEM
Filed Jan. 14, 1939   3 Sheets-Sheet 1

INVENTOR
Charles R. Doty
BY
ATTORNEY

Oct. 8, 1940.    C. R. DOTY    2,217,161
SIGNALING SYSTEM
Filed Jan. 14, 1939    3 Sheets-Sheet 2

Fig. 1.

| | CONTACTS | | | | | | | | | | | | |
|---|---|---|---|---|---|---|---|---|---|---|---|---|
| SPACE | C-7 | C-6 | C-5 | C-4 | C-3 | C-2 | | C-7 | C-6 | C-5 | C-4 | C-3 | C-2 |
| SPACE | − | − | − | − | − | − | W | + | − | − | − | + | − |
| Z | + | + | − | − | + | − | E | + | − | − | − | − | + |
| X | + | + | − | − | − | + | R | + | − | − | + | − | − |
| C | + | + | − | + | − | − | T | + | − | − | + | + | − |
| V | + | + | − | + | + | − | Y | + | − | − | + | − | + |
| B | + | + | − | + | − | + | U | + | − | + | − | − | − |
| N | + | + | + | − | − | − | I | + | − | + | − | + | − |
| M | + | + | + | − | + | − | O | + | − | + | − | − | + |
| , | + | + | + | − | − | + | P | + | − | + | + | − | − |
| . | + | + | + | + | − | − | @ | + | − | + | + | + | − |
| / | + | + | + | + | + | − | CR | + | − | + | + | − | + |
| A | − | + | − | − | + | − | TAB | + | + | + | + | − | + |
| S | − | + | − | − | − | + | 2 | − | − | − | − | + | − |
| D | − | + | − | + | − | − | 3 | − | − | − | − | − | + |
| F | − | + | − | + | + | − | 4 | − | − | − | + | − | − |
| G | − | + | − | + | − | + | 5 | − | − | − | + | + | − |
| H | − | + | + | − | − | − | 6 | − | − | − | + | − | + |
| J | − | + | + | − | + | − | 7 | − | − | + | − | − | − |
| K | − | + | + | − | − | + | 8 | − | − | + | − | + | − |
| L | − | + | + | + | − | − | 9 | − | − | + | − | − | + |
| % | − | + | + | + | + | − | " | − | − | + | + | − | − |
| $ | − | + | + | + | − | + | - | − | − | + | + | + | − |
| Q | + | − | − | − | − | − | BS | − | − | + | + | − | + |

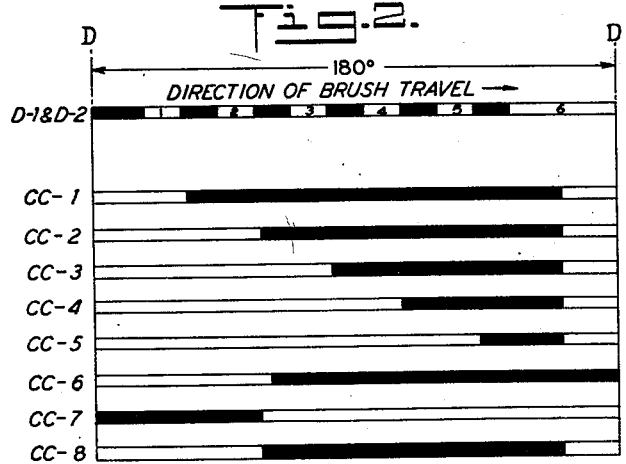

Fig. 2.

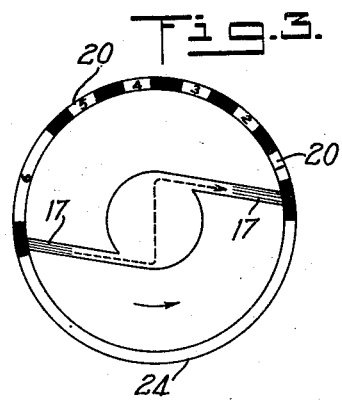

Fig. 3.

INVENTOR
Charles R. Doty
BY
ATTORNEY

Oct. 8, 1940.  C. R. DOTY  2,217,161
SIGNALING SYSTEM
Filed Jan. 14, 1939  3 Sheets—Sheet 3
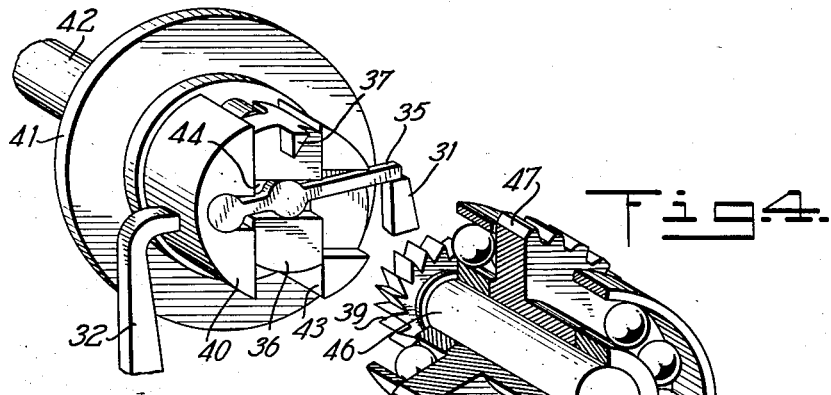
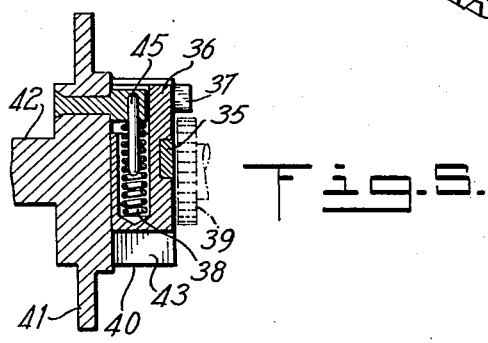
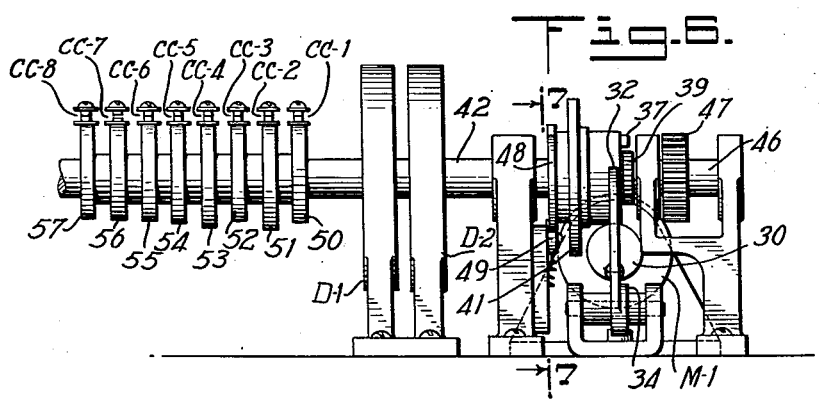
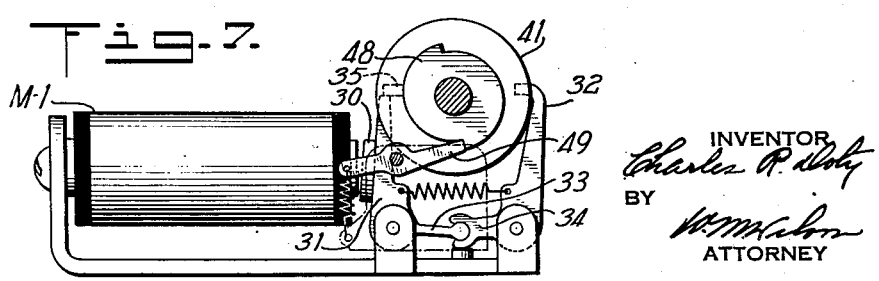
INVENTOR
Charles R. Doty
BY
ATTORNEY Patented Oct. 8, 1940

2,217,161

UNITED STATES PATENT OFFICE 2,217,161

SIGNALING SYSTEM

Charles R. Doty, Yonkers, N. Y., assignor to International Business Machines Corporation, New York, N. Y., a corporation of New York Application January 14, 1939, Serial No. 250,875

3 Claims. (Cl. 178—23)

This invention relates to signaling systems and more particularly to printing telegraph systems of the nonsynchronous type.

In the instant invention, code combinations of impulses having differentiating characteristics are utilized; the said differentiating characteristics of the impulses may be polarity distinctions; that is, code combinations of negative and positive impulses may be employed for controlling the selection of the different control circuits. In addition thereto, provision is made at the transmitting station whereby a group of six impulses of varying polarity are initiated to represent each character, the first five impulses having the same certain voltage values and the sixth impulse having a greater voltage value imparted thereto. These impulses are adapted to control selectively the operation of a group of electron discharge devices which are provided with predetermined biases, so that the first group of five impulses are effective to control the operation of a pair of said discharge devices and the sixth impulse effective to control the operation of another pair of discharge devices.

A plurality of series of relays are provided at the receiving station and are controlled by the various discharge devices mentioned. One series of relays is adapted to be controlled by impulses of one polarity and are rendered operative in succession upon receipt of the individual impulses, whereas another series of relays are adapted to be controlled by impulses of another polarity solely, for rendering the first said series of relays operative successively and also for selecting certain of the character recording control circuits.

It will be shown hereinafter the provision is made in the instant application whereby a predetermined group of impulses of varying characteristics are transmitted representing the character signals, each character signal comprising the same number of impulses, and that means are provided to be selectively controlled by the said impulses for controlling the successive operation of a plurality of series of relays in accordance with the polarity characteristics of the impulses.

Character indicating control means are selected in accordance with the code combinations of impulses received by the said conditioned series of relays and are in turn conditioned for energization. Energization of the said selected control means is then effected and controlled by additional control means responsive to the last impulses of each code combination.

Therefore, it is an object of the present invention to provide means responsive selectively to code combinations of impulses having varying characteristics which are effective to control selectively the energization of individual series of relays in accordance with the polarity characteristics of the impulses for effecting selection of certain character indicating control means in accordance with the character signals received.

Another object of the present invention is the provision of means whereby the said selected indicating control means are conditioned for energization, which energization is effected upon receipt of the last impulse of each code combination of impulses.

Further objects of the instant invention reside in any novel feature of construction or operation or novel combination of parts present in the embodiment of the invention described and shown in the accompanying drawings, whether within or without the scope of the appended claims and irrespective of other specific statements as to the scope of the invention contained herein.

In the drawings:

Fig. 2 is a timing diagram.

Fig. 3 is a detail view of one of the signal distributors.

Fig. 4 is a perspective view of the clutch element.

Fig. 5 is a detailed sectional view of the clutch element.

Fig. 6 is an elevation view of the cam shaft and clutch assembly.

Fig. 7 is a view taken along the lines 7—7 of Fig. 6.

Fig. 8 is one form of preferred signal code.

Transmitting circuit arrangement

Figure 1:
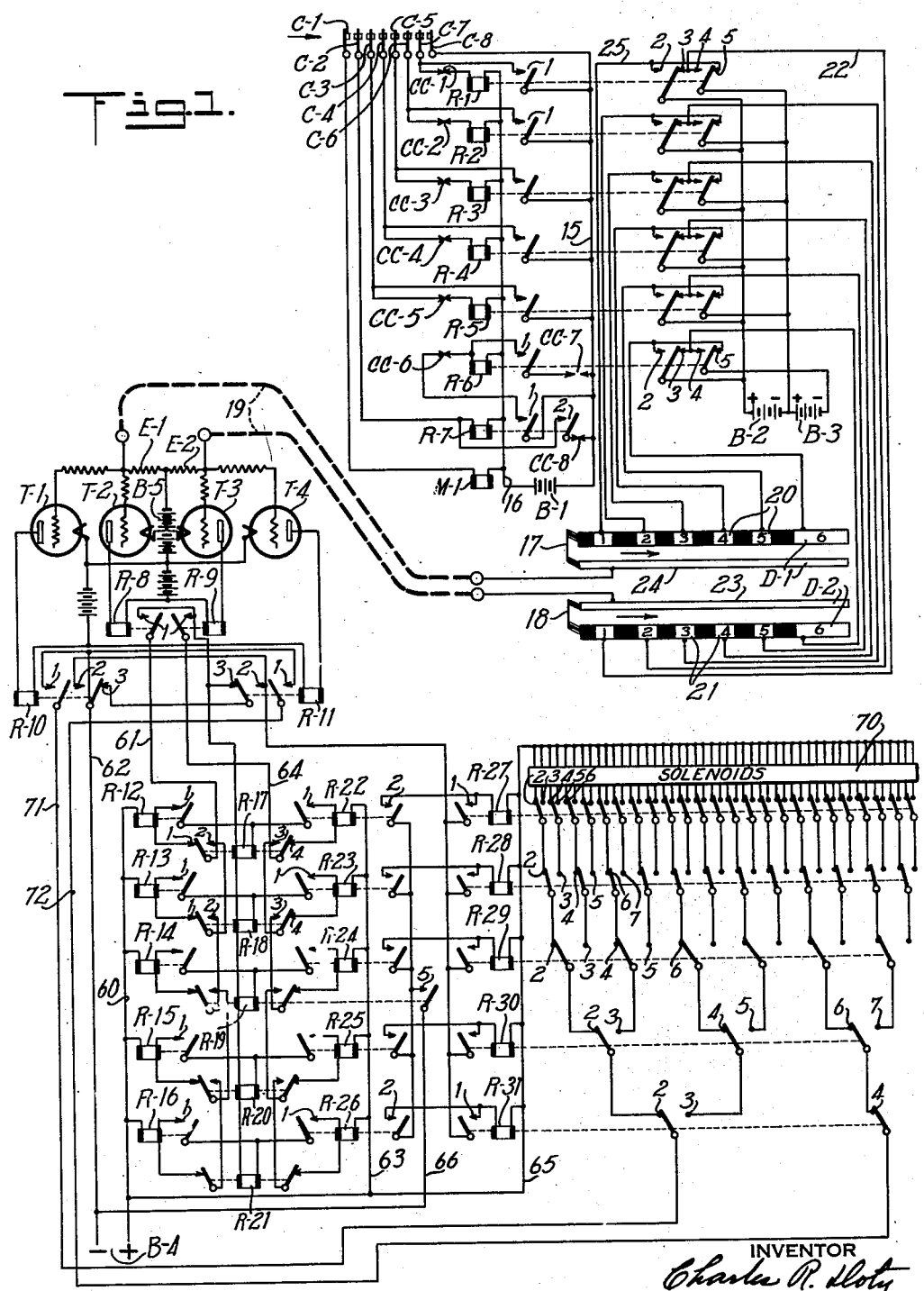
Fig. 1 is a circuit diagram of the signal transmitting and receiving circuits.

Referring now to Fig. 1, the control circuits of the signal transmitting arrangement are shown to comprise a plurality of control relays R—1 to R—7, the energization of which are controlled by the individual contacts C—1 to C—8 which are connected thereto. The said contacts are adapted to be closed upon operation of the character keybars of the tele-typing unit in any suitable manner. Let it be assumed that the contacts arranged in various combinations are suitably disposed beneath the keybars, so that upon depression thereof the group of contacts are operated thereby. It is believed that further description and disclosure of this method of operating the impulse initiating means (contacts C—1 to C—8) is not necessary, since this exact practice is quite old and well known in the art. The arrow in Fig. 1 represents the depression of the associated keybar to effect closure of the suitably disposed contacts C—1 to C—8. It is seen upon closure of the said group of contacts the associated relays R—1 to R—5 are energized immediately by means of battery B—1 and suitable locking circuits established through the contacts designated 1 associated with the individual relays. It is to be noted that the circuits established to the said relays include the individual cam controlled contacts CC—1 to CC—5, the purpose of which will be understood as the description progresses.

The energization of relay R—6 is controlled by the operation of relay R—7 as follows: upon closure of the said group of contacts C—1 to C—8, a circuit is established from battery B—1, common conductor 15, contacts C—8 to C—2, coil of relay R—7 and common conductor 16 to the said battery. A holding circuit for relay R—7 is immediately established by means of the contacts 2 associated therewith and the normally closed cam contacts CC—8. Through the contacts 1 of relay R—7, a circuit from battery B—1 is established through the coil of relay R—6 and normally closed cam contacts CC—6 to energize this last mentioned relay; however, a holding circuit is not established therefor until the cam contacts CC—7 are closed.

A plurality of individual contacts designated 2 to 5 are provided for each of the relays R—1 to R—6 and are adapted upon energization of the associated relay coils to establish circuits through the contacts 2 and 4 and open the normally established circuits through contacts 3 and 5. The purpose of these contacts is that of reversing the poles of batteries B—2 and B—3 so that, when the brushes 17 and 18 of the distributors D—1 and D—2 are set in motion, impulses of different polarities are impressed upon the associated transmission medium 19; assume that the voltages of the batteries B—2 and B—3 are equivalent to ninety volts, it is seen that positive and negative impulses of ninety volts are impressed upon the transmission medium by means of the distributors and contacts 2 to 5 of relay R—1 to R—5 and that positive and negative impulses of one hundred and eighty volts are impressed upon the medium through the contacts 2 to 5 of relay R—6.

Assume now for the moment that the relays R—1 to R—6 remain deenergized and that the brushes 17 and 18 are set in motion to traverse successively the conducting segments 20 and 21 of the distributors D—1 and D—2 in the directions indicated by the arrows; it is seen that, when the brushes engage the first conducting segments of each distributor, the following circuit is established: from the positive terminal of battery B—2, contacts 3 of relay R—1, conductor 22, the associated conducting segment 21, brushes 18, common conducting ring 23, one leg of the transmission medium 19 to the terminal equipment at the receiving station and the return leg of the transmission medium to the common conducting ring 24, brushes 17, the conducting segment 20 connected to the contacts 5 of relay R—1 to the negative terminal of the said battery, thus establishing a flow of current in one direction over the transmission medium, or stated in other words, initiating a signal impulse of a certain polarity and the potential of which is equivalent to ninety volts. As the brushes 17 and 18 continue to rotate, the remaining five conducting segments of each distributor are engaged to impress signal impulses of like polarity upon the transmission medium in a like manner. The first five impulses initiated are all of the same voltage values; however, the sixth or last impulse impressed upon the transmission medium is of the order of one hundred and eighty volts, due to the series connection of batteries B—2 and B—3 and the contacts 3 and 5 of relay R—6.

It is understood now that in the event any one or more of the relays R—1 to R—6 are energized to close the associated contacts 2 and 4 and open contacts 3 and 5 that, as the brushes 17 and 18 traverse the associated conducting segments 20 and 21, signal impulses of the opposite polarity would be impressed upon the transmission medium; for example, assume that relay R—1 is operated to close contacts 2 and 4 and brushes 17 and 18 engage the connected conducting segments 20 and 21, current from battery B—2 is permitted to flow from the positive terminal of the said battery through contacts 2 of relay R—1, conductor 25, connected conducting segment 20, brushes 17, conducting ring 24, transmission medium 19 and associated terminal equipment, common conducting ring 23, brushes 18, conducting segment 21, and connected conductor 22, contacts 4 of relay R—1 to the negative terminal of the said battery. It is seen now that whenever any of the relays R—1 to R—6 are operated, the direction of the flow of current impressed upon the transmission medium is reversed and thereby equivalent to impressing impulses of the opposite polarity thereon. For illustrative purposes, let it be assumed that the current impressed upon the transmission medium when the relays R—1 to R—6 are inoperative flows in a direction so that the effect thereof at the terminal equipment is equivalent to impulses of negative polarity and those impulses impressed upon the said medium when any one of the said relays are operated being of positive polarity.

Normally, the brushes 17 and 18 of the distributors D—1 and D—2 are adapted to be in an unoperated position, as shown in Fig. 1, engaging the insulating segments of each distributor. Upon operation of the character keybars, the brushes are adapted to be released by means of a control magnet M—1 which is connected directly to contacts C—1 and C—8 and the battery B—1 so that upon operation of the contacts the said magnet is energized.

Referring now to Figs. 4 to 7, it is seen that upon energization of magnet M—1, the associated armature 30 supported by the pivoted pawl member 31 is attracted to swing the said pawl to the left as viewed in Fig. 7. Pawl 31 imparts motion to the pawl member 32 by means of the interlocking extension fingers 33 and 34 which are secured to the pawls 31 and 32 respectively. By means of the described connection between the said pawls, pawl 31 swings to the left and pawl 32 to the right upon energization of the magnet M—1 (Fig. 7).

The said pawls are positioned so that normally they are in the path of the extended dog lift lever 35 so that normally the said lever abuts one of the said pawls. Upon energization of the magnet M—1 and displacement of the said pawls the lever 35 is released to permit the dog 36 provided with the single tooth 37 to be released and urged by spring 38 to position the dog so that the tooth 37 engages the ratchet wheel 39. It should be mentioned that the lever 35 is pivotally supported by the annular member 40 which by means of the disc 41 is secured to the driven shaft 42. The annular member 40 is provided with a channel 43 into which the slidable dog 36 is disposed. The said dog is provided with a recess 44 into which the lever 35 is fitted so that upon movement of the said lever the dog 36 can be shifted accordingly. A spring post 45 is also provided as part of the annular member 40 for supporting the spring 38 over which the slidable dog 36 is formed, so that normally the spring urges the dog in a direction so that the tooth 37 thereon engages the ratchet 39. This action takes place upon the release of the lever 35 whenever the magnet M—1 is energized; thus, the driven shaft 42 is coupled by means of the described clutch to the constantly rotated shaft 46 secured to ratchet 39 and driven by gear 47 coupled to any suitable driving means.

Upon deenergization of the magnet M—1, the pawls 31 and 32 are restored in the path of the lever 35 so that one of the pawls are engaged thereby, thus uncoupling the driving and driven shafts, since it is seen that whenever the lever 35 engages one of the pawls 31 or 32 the dog 36 is positioned thereby so that the tooth 37 is disengaged from the driving ratchet 39. For a more detailed description of the clutch elements, reference may be made to the copending application Serial No. 171,925, filed October 30, 1937. A clutch retaining cam 48 is provided and secured to disc 41 and is engaged by a suitable retaining pawl 49 so as to prevent any reverse motion of the clutch parts when uncoupling of the driving and driven shafts is effected.

A group of cam discs 50 to 57 are provided and secured to the driven shaft 42 (see Fig. 6), to which shaft the brushes 17 and 18 of distributors D—1 and D—2 are also secured. Fig. 3 is a detailed view showing the arrangement of the distributor brushes and conducting sections of the distributor. It is seen by referring to the timing chart in Fig. 2 that the brushes 17 and 18 engage an insulating segment when in the normal "D" or inoperative position; it is also seen from the timing chart that normally the cam contacts CC—1 to CC—6 and CC—8 are closed. This fact was mentioned earlier in the present description. The shaded sections represent the periods or intervals during the distributor cycle when the contacts are opened. It is seen that the cam contacts CC—1 to CC—5 are adapted to be opened for short intervals each cycle immediately after the brushes 17 and 18 engage the first to fifth conducting segments respectively. It is also evident from the drawings and description thus far that a distributor cycle is equivalent to one-half of a revolution of the driven shaft 42. It is assumed that the character keybars are depressed only momentarily, thus causing the magnet M—1 to be energized for a brief interval, just long enough to release the lever 35, so that upon deenergization thereof the stop pawls 31 and 32 are restored in the path of the said lever to effect a de-clutching action upon the completion of a half revolution of the driven shaft 42.

Now returning for the moment to Fig. 1, it is remembered that upon closure of the contacts C—1 to C—8, relays R—1 to R—5 are energized and holding circuits are established through the contacts 1 of the associated relays and the corresponding contacts CC—1 to CC—5. It is seen now that the control magnet M—1 is also energized momentarily to effect rotation of the driven shaft 42 for a cycle, thus advancing the brushes 17 and 18 to engage in succession the associated conducting segments 20 and 21, and also rotating the cam discs 50 to 57, controlling the operation of the associated contacts CC—1 to CC—8.

After the said distributor brushes have passed over the first conducting segments to impress the first signal impulse upon the transmission medium, the contacts CC—1 are opened to open the holding circuit for relay R—1 thus causing this relay to be restored to the normal position shown in the figure. Similarly, relays R—2 to R—5 are deenergized as the said brushes pass the second to fifth conducting segments due to the opening of the associated cam controlled contacts CC—2 to CC—5. It was also mentioned hereinabove that upon closure of contacts C—2, relay R—7 is energized to control the energization of relay R—6, but that no holding circuit for the last mentioned relay is established at that particular time. It is seen now from the timing chart as the released brushes pass from the second to the third conducting segments of the distributors that the cam contacts CC—7 are closed, thus establishing a holding circuit for relay R—6 through the associated contacts 1; and shortly thereafter cam contacts CC—6 and CC—8 are opened, thus isolating the relay R—6 and preventing faulty operation thereof. Opening of contacts CC—8 causes the relay R—7 to be denergized and prevents this relay from being operated again until the brushes pass over the sixth conducting segments of the distributors. In this manner it is seen that relay R—6 remains operated until the end of the distributor cycle to control the positioning of the associated contacts.

The delayed operation of relay R—6 and isolation thereof after establishing the holding circuit therefor is to provide a certain degree of overlap. It has been found that the operation of the control elements described thus far can be arranged to operate at sufficient speeds and the timing thereof be adequate for initiating signal impulses for normal typing operations without provision of the overlap feature described. However, in such cases where the individual keybars may be depressed successively so rapidly that the control circuits are established for the second character while the brushes of the distributor are passing over the sixth conducting segments thereof during the first cycle, it is seen that without overlap provision for the transmission of the sixth impulse faulty signal conditions could arise. However, from the description given regarding the overlap feature, it is evident that in the event a keybar is depressed while the brushes are engaging the sixth conducting segments of the distributors that the control circuits for relays R—1 to R—5 can be established at that time; however, the said operation of the keybar is not effective to control the operation of relay R—6 at that time and alter its condition before the completion of the signaling cycle. Relay R—7 is energized to store the sixth signal condition and transfers its setting to relay R—6 during the first part of the following distributor cycle when cam contacts CC—6 close and finally maintaining the setting thereon upon closure of contacts CC—7.

The description of the transmitting arrangement of the instant invention has been confined to the showing of a single group of contacts C—1 to C—8 operated upon the depression of the associated keybar. All of the necessary control circuits for a complete transmitting unit have been shown associated with the said single group of contacts, and the reason thereof being to simplify the disclosure of this unit. It is understood that all the desired individual keybars of the tele-typing unit are provided with similar groups of contacts as described and connected in multiple to the associated control circuits described. The combinations of contacts vary for each character keybar. The contacts C—1 and C—8 are provided for every keybar since these contacts control the battery supply and the common control magnet M—1. The other keybars are provided with the contacts C—2 to C—7 in accordance with any desired code. In order to provide a complete disclosure of one form of transmitting unit which may be used, a complete character code is given and shown in Fig. 8. Now continuing with the assumption that the contacts 2 to 5 of the relay R—1 to R—6 are connected to the distributors and batteries so that, when the said relays are inoperative, negative impulses are impressed upon the transmission medium whenever the associated distributor brushes are set in motion and positive impulses are impressed thereon whenever the said relays are operated; it is understood, then, for the keybar representing the character "X" that contacts C—2, C—6 and C—7 are provided in addition to the contacts C—1 and C—8, so that upon operation of these contacts relays R—1, R—2, R—6 and R—7 and the control magnet M—1 are energized, thereby causing the distributor brushes to be released and conditioning the associated control circuits so that upon engagement of the conducting segments by the said brushes during the single distributor cycle, the first two impulses impressed successively upon the transmission medium are positive impulses of the order of ninety volts; the next three impulses being negative impulses of the order of ninety volts and the sixth or last impulse being a positive impulse of one hundred and eighty volts. The remaining desired character keybars may then be provided with the combinations of contacts as indicated in Fig. 8 for controlling the initiation of the representing signals comprising the code combinations of impulses having the differentiating polarity characteristics indicated therein.

Now by continuing the reference to Fig. 1, a preferred form of receiving circuit will be explained, which is capable of utilizing the described code combinations of impulses having different polarity and voltage characteristics for selecting the control circuits corresponding to the received signals and thereby effecting operations of the associated character indicating control means.

*Receiving circuit arrangement*

From the figure it is seen that the transmission medium 19 terminates into two resistors E—1 and E—2 connected in series, the center tap of which is connected to the negative terminal of battery B—5, and the terminals of which are connected to the individual grid elements of the tubes T—1, T—2 and T—3, T—4 respectively. For purposes of illustration, assume that each of the resistors E—1 and E—2 are of the order of 25,000 ohms and that biasing potentials of ninety volts are impressed on tubes T—1 and T—4 and forty-five volts on tubes T—2 and T—3, thereby rendering these tubes non-conductive, and furthermore that tubes T—1 and T—2 are adapted to be rendered conductive by the receipt of the negative impulses and tubes T—3 and T—4 by the positive impulses.

For the purposes of effecting the proper selection of the character indicating control means, character signals comprising six impulses are employed, the first five impulses having a potential value of ninety volts and the sixth impulse a potential value of one hundred and eighty volts. It is evident then that upon receipt of the ninety volt signals, a voltage drop of forty-five volts appears across each of the resistors E—1 and E—2, and depending upon the polarity thereof the biases impressed upon the tubes T—2 and T—3 will be altered so as to be of the order of ninety and zero volts, causing the tube having the zero bias to be conductive as long as the described condition exists, thereby effecting energization of either relay R—8 or R—9 associated with the tubes T—2 and T—3, respectively. Since the tubes T—1 and T—4 are biased by a ninety volt potential, these tubes remain non-conductive upon receipt of the ninety volt signal impulses.

Closure of the contacts 1 of relays R—8 or R—9 is effective to energize either relay R—12 or R—22 depending upon the polarity of the impulse received; if negative, relay R—8 is energized to establish a circuit from the positive terminal of battery B—4 to common conductor 60, coil of relay R—12, normally closed contacts 1 of relay R—17, conductor 61, contacts 1 of relay R—8, normally closed contacts 3 of relays R—11 and R—10, conductor 62 to the negative terminal of battery B—4, energizing relay R—12; and if the said impulse is positive, relay R—9 establishes a circuit from the positive terminal of said battery B—4 to conductor 63, coil of relay R—22, normally closed contacts 4 of relay R—19, conductor 64, contacts 1 of relay R—9 to the negative terminal of the battery by the same return circuit just described, thus energizing relay R—22. Upon operation of either relay R—12 or R—22, a holding circuit is established therefor through the associated contacts 1 of either relay, the coil of relay R—17 and the return circuit described to the negative terminal of battery B—4. The current flow through the coil of relay R—17, while contacts 1 of either relay R—8 or R—9 are closed, is insufficient to effect operation of relay R—17 but is of sufficient value to maintain either relay R—12 or R—22 energized, due to the shunt arrangement of contacts 1 of relays R—8 and R—9; upon deenergization of either relay R—8 or R—9 the associated contacts 1 are opened thereby permitting a sufficient current flow through the coil of relay R—17, operating this last mentioned relay to open the associated contacts 1 and 4 and closing contacts 2 and 3.

It is seen that closure of the contacts 2 and 3 of relay 17, completes the connections from the contacts 1 of relays R—8 and R—9 to the coils of relays R—13 and R—23 respectively, so that upon subsequent operation of either relay R—8 or R—9, relay R—13 or R—23 will be energized due to the closure of the contacts 1 of relay R—8 or R—9.

From the description up to this point it is understood that the chain of relays R—12 to R—16 are energized solely upon receipt of negative impulses having potentials of ninety volts and that the chain of relays R—22 to R—26 are energized solely upon receipt of the positive ninety volt impulses. The relays of the said chains are not necessarily operated in a straight progression but can be selectively energized depending upon the associated control circuits conditioned by the third chain of relays R—17 to R—20, for example, assume that one of the character signals comprises a combination of impulses of which the first, third and fifth impulses are negative and the second and fourth are positive pulses; for this signal condition, relays R—12, R—14, R—16 are energized upon receipt of the negative impulses and relays R—23 and R—25 are energized upon receipt of the positive impulses. The conditioning of the control circuits for the chains of relays R—12 to R—16 and R—22 to R—26 is controlled by the chain of relays R—17 to R—20. The last mentioned chain of relays is adapted to be operated in a straight progression upon the receipt of the series of signal impulses, irrespective of the polarity of the impulses. It is to be noted that the operation of the said chain of relays R—17 to R—20 is controlled by both the chains of relays R—12 to R—16 and R—22 to R—26, that is, the operations of the individual relays of the chain, namely, R—17 to R—20, are controlled by the operations of the corresponding relays of the chain R—12 to R—16 and chain R—22 to R—26.

In addition to the described functions of the chain of relays R—22 to R—26, namely, that of being controlled by the positive impulses for controlling the stepping of the relays of the chain R—17 to R—21, selecting functions of the character indicating control means are performed by the chain of relays R—22 to R—26. It is seen that the individual selector magnets of the series R—27 to R—31 are connected to the individual contacts designated 2 of the relays R—22 to R—26. Therefore, upon operation of any of the relays of the group R—22 to R—26, a circuit or circuits are established to operate the associated magnets of the series R—27 to R—31; the circuits can be traced as follows—from the positive terminal of battery B—4, conductor 65, coils of magnets R—27 to R—31 to the corresponding contacts 2 of relays R—22 to R—26, contacts 5 of relay R—19, conductor 66 to the negative terminal of the said battery. It is seen that the battery circuits described for the magnets R—27 to R—31 are not established until the relay R—19 of the chain is energized to close the associated contacts 5. It has been found that the margin of timing of the operations of the various control elements in the receiving circuit arrangement is increased by the delayed energization of the said selector magnets.

Each of the said selector magnets R—27 to R—31 are provided with a plurality of contacts 2, 3, 4, etc. the interconnecting circuits of which are shown connected to individual solenoids of a group designated generally by the reference character 70. It is understood that the individual solenoids are operatively associated with the individual character indicating or recording instrumentalities of the tele-printing unit, which practice is old and well known in the art, so that upon selection and energization of the individual solenoids the associated and corresponding indicating or recording instrumentalities are rendered operative, thereby effecting registration of the characters in accordance with the character signals received.

It is also evident that the selector magnets R—27 to R—31 instead of being provided with the groups of said contacts for effecting single solenoid selection in accordance with the permutative settings of the selector magnets, can be employed as the well-known permutation bar selector magnets used in the well known five unit code printing telegraph systems.

It is evident that the different solenoid selections can be effected by operation of the selector magnets R—27 to R—31 in different combinations; this method of selecting a single control circuit from a plurality by employing a combinational code control system is quite old and understood by those skilled in the art so that further description thereof is deemed unnecessary.

Now assume that the first five impulses of the character signal have been received and that single control circuit including the character solenoid corresponding to the signal has been selected or, stated in other words, the selected solenoid circuit has been conditioned for energization thereof; it will now be shown how the sixth or last impulse is effective to energize the selected solenoid circuit and restore the operated control relays and associated circuits to the normal condition as shown in the figure in preparation for subsequent reception of the character signals thereby effecting further character registration accordingly.

It was mentioned hereinabove that the sixth and last impulse has a potential of one hundred and eighty volts, the reason being so that this last impulse of the combination is effective to overcome the biasing potentials of ninety volts impressed on the tubes T—1 to T—4, and as mentioned before it was assumed that the tube T—1 is rendered conductive by the negative impulses of this potential and the tube T—4 is rendered conductive by the positive impulses. Thus, it is seen that the last impulses are effective to operate either relay R—10 or R—11 depending upon the polarity of the impulses. The contacts designated by the reference character 1 associated with the said relays are effective when operated to connect the battery B—4 to the circuit including the desired solenoid and selected by the operation of the selector magnets R—27 to R—31, as follows — from the negative terminal of battery B—4, conductor 62, contacts 1 of relay R—10 or R—11, conductor 71 or 72 to one terminal of the selected solenoid, the other terminal of which is connected by the common conductor 65 to the positive terminal of the said battery, thereby energizing the selected solenoid to effect character registration.

The contacts 2 and 3 of relays R—10 and R—11 are the make before break type; therefore, it is seen that by means of the contacts 2 of each relay the battery B—4 is connected to the closed contacts 1 of the operated magnets of the chain R—27 to R—31 to maintain the selection until registration has been effected, these circuits are established before the contacts 3 of the relays are opened, since it is seen that opening of the said contacts 3 of the relays R—10 and R—11 are effective to open the holding circuits for the three chains of relays described; namely, R—12 to R—16, R—17 to R—21 and R—22 to R—26, thereby restoring these relays of the chains which have been operated to the normal inoperative condition. The solenoid circuits are energized as long as the last signal impulse is impressed upon the receiving circuit, upon cessation thereof the relays R—10 and R—11 are rendered inoperative.

It should be mentioned that upon receipt of the last impulses of the signals the tubes T—2 and T—3 are also rendered conductive; however, no faulty operations are effected at this time, since no additional circuit associated with the chains of relays can be established during the reception of the sixth impulse, since relay R—21 is always operated upon the decay of the fifth impulse; also, relay R—8 and R—9 are high speed relays and are adapted to permit opening of the contacts associated therewith before the contacts 1 to 3 associated with relays R—10 and R—11 are opened, thereby preventing the battery B—4 to be connected to any of the chains of relays upon restoration of the contacts of relays R—10 and R—11 to normal.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A communication system including means for transmitting character signals comprising a predetermined group of impulses having differentiating polarity characteristics including means whereby the same number of impulses is transmitted for each character, a plurality of electric discharge devices responsive to the said signals including means whereby the devices are operated selectively in accordance with the polarity characteristics of the impulses, character indicating control means and control circuits therefor, a series of control relays controlled by certain of said devices upon receipt of the impulses including means whereby the relays are operated selectively whenever the said received impulses have certain polarity characteristics, a second series of control relays controlled by another of said devices, upon receipt of the impulses having other certain polarity characteristics including means whereby the said second series of relays are jointly controlled by the last mentioned device and the first mentioned series of relays for selectively controlling the said control circuits and character indicating control means in accordance with the received character signals.

2. A communication system of the character described including means for transmitting character signals comprising a predetermined group of impulses having differentiating polarity characteristics including means whereby the same number of impulses are transmitted for each character and means for imparting the same predetermined voltage values to certain of the impulses and a greater voltage value to the last impulses of each group, means including a plurality of electric discharge devices responsive to the impulses of lesser voltage values including means whereby the devices are selectively controlled by the polarity characteristics of the impulses, a plurality of control circuits, means controlled by the said devices for selectively conditioning certain of the said control circuits for energization, and means including other electric discharge devices responsive to the said last impulses having greater voltage values including means for controlling the energization of predetermined ones of the said selected control circuits.

3. The invention set forth in claim 2 including a plurality of series of control relays controlled by the first mentioned electric discharge devices and including means whereby the said relays are controlled selectively by the devices upon receipt of the impulses for controlling the selection of the control circuits.

CHARLES R. DOTY.